3 Sheets--Sheet 1.

W. H. DOANE & G. W. BUGBEE.
Boring-Machines.

No. 146,885.

Patented Jan. 27, 1874.

Attest
C. G. Hale
John E. Hatch

Inventor
W. H. Doane and
G. W. Bugbee by
Fisher & Duncan
Attys.

3 Sheets--Sheet 2.
W. H. DOANE & G. W. BUGBEE.
Boring-Machines.
No. 146,885.   Patented Jan. 27, 1874.
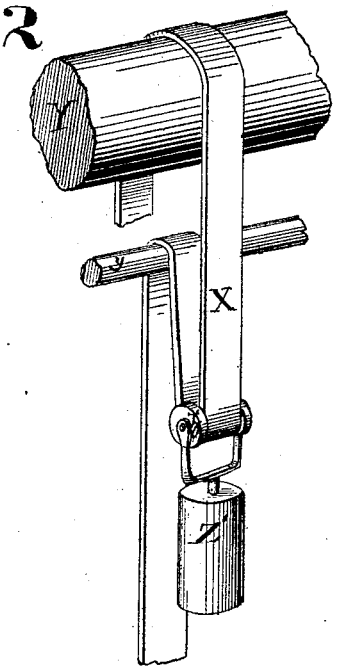
Fig. 2
Fig. 3
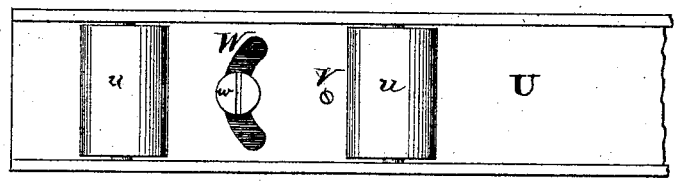
Fig. 4
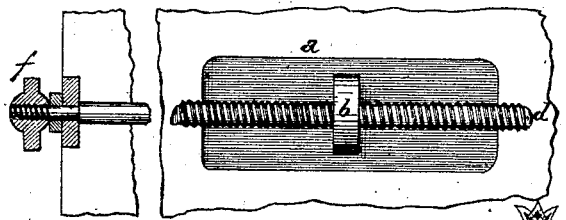
Attest
C. G. Hale
John E. Stotets
Inventor
W. H. Doane and
G. W. Bugbee by
Fisher & Duncan
attys 3 Sheets--Sheet 3.

W. H. DOANE & G. W. BUGBEE.
Boring-Machines.

No. 146,885. Patented Jan. 27, 1874.

Attest
C. G. Hale
John E. Hatch

Inventor
W. H. Doane and
G. W. Bugbee by
Fisher + Duncan
Attys.

AM. PHOTO-LITHOGRAPHIC CO. N.Y. (OSBORNE'S PROCESS.)

UNITED STATES PATENT OFFICE.

WILLIAM H. DOANE AND GEORGE W. BUGBEE, OF CINCINNATI, OHIO, ASSIGNORS TO J. A. FAY & CO., OF SAME PLACE.

IMPROVEMENT IN BORING-MACHINES.

Specification forming part of Letters Patent No. 146,885, dated January 27, 1874; application filed February 21, 1873.

*To all whom it may concern:*

Be it known that we, WILLIAM H. DOANE and G. W. BUGBEE, both of Cincinnati, in the county of Hamilton and State of Ohio, have invented certain Improvements in Boring-Machines, of which the following is a specification:

Our invention relates to mechanism for a straight angle and end boring machine for heavy timber, to be used especially in car and bridge building, whereby little movement of the timbers is necessary, the machine itself being adjustable.

Figure 1:
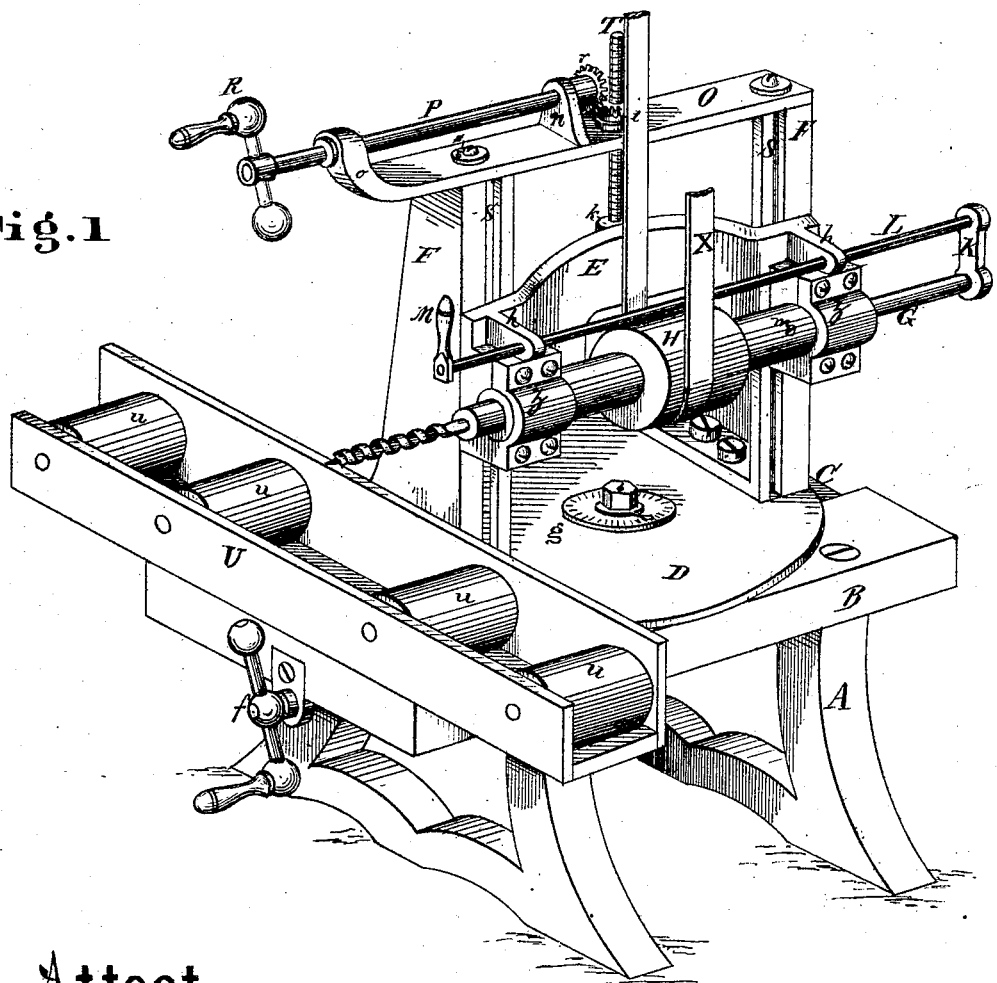
Figure 5:
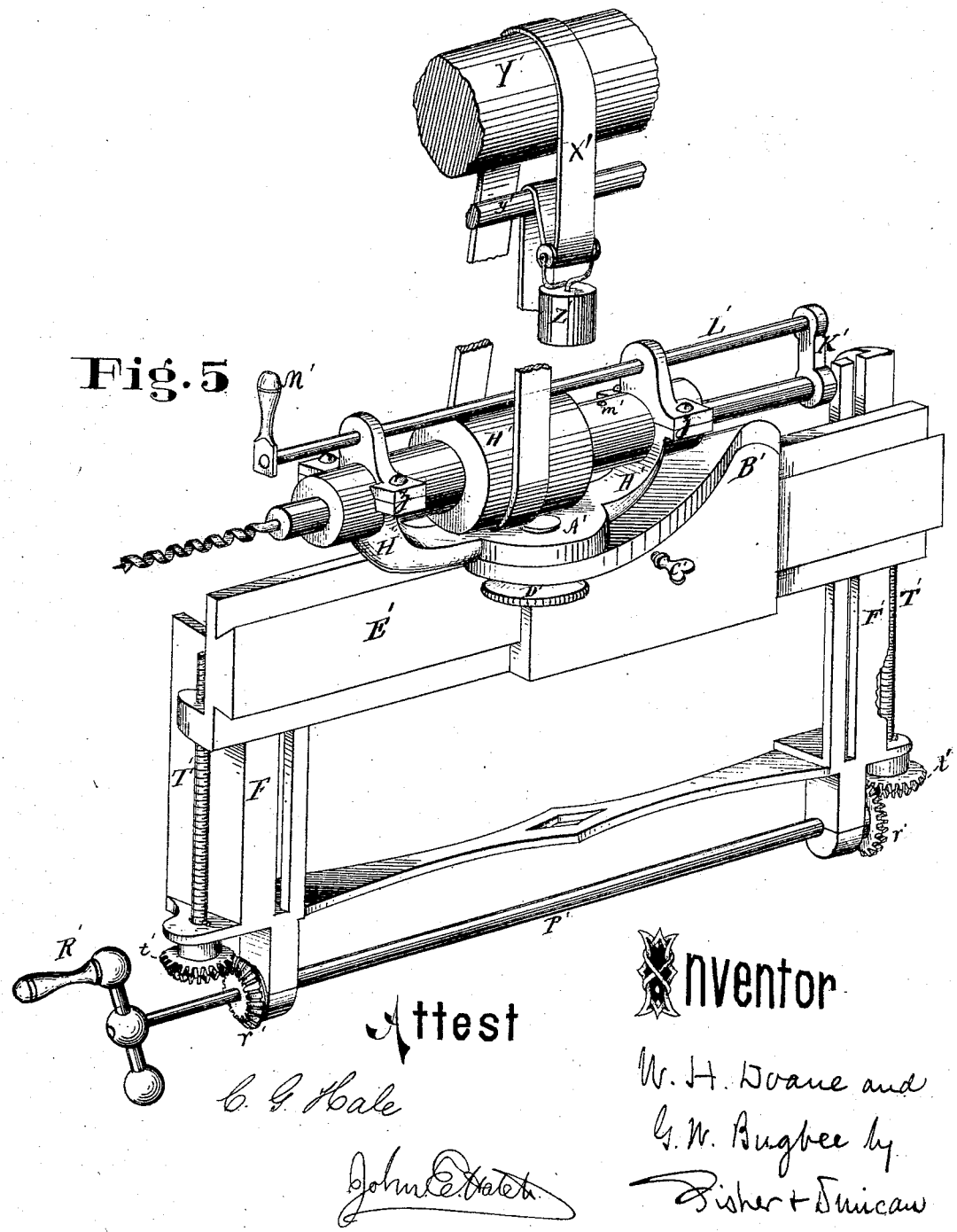

In the drawings, Figure 1 represents a front view of my machine, the belt being broken away for convenience of representation. Fig. 2 shows the peculiar manner of driving the machine, and exhibits the weighted pulley for keeping the belt always taut. Fig. 3 represents the timber-bed and the manner of adjusting the same. Fig. 4 represents the mechanism for giving the head or carriage a horizontal movement. Fig. 5 represents a modification of the machine.

A represents the solid frame-work of the machine, the table of which, B, has a longitudinal slot, $a$, Fig. 4, in which the arm $b$ moves. In the upper side of table B is a groove or dovetail, C, in which moves a slide attached to the head or carriage, and which holds the head in position. Working in the arm $b$ is the screw $d$, Fig. 4, operated by a crank, $f$, by which the head can be moved forward or backward, and firmly fixed at any distance from the timber to be bored. D is a metallic disk, perforated at its center, and fastened to the shank of arm $b$, about which it may be turned, and adjusted at any angle. It may be fitted with a graduated plate and index, $g$, to denote the angle at which it stands. Securely fastened to disk D are standards F F, for supporting the boring mechanism. In each standard is a vertical slot, S S, which may extend the whole length of the standard, and in which lugs on plate E slide up and down, being held in place by screws upon the back of the standards. Plate E is also fitted with lug $k$ in its rear, and in its front lugs $h\ h$ and boxes $z\ z$. In these boxes turns the spindle G by means of the driven pulley H. The spindle is flattened on one side, or fitted with a longitudinal groove, into which projects the screw $m$, so that when pulley H is revolved the spindle bearing the auger must revolve also at the same rate, but allowing at the same time spindle G to move forward freely through pulley H as the auger enters the wood. At the end of the spindle G farthest from the operator the piece K is securely fitted by one end, while to the other is attached the rod L, which slides in holes in lugs $h\ h$, and to the end of which is attached handle M, whereby the auger is advanced into the wood or removed therefrom by the hand of the operator. Any suitable mechanism, as cord, pulley, and treadle, may be used for the purpose. At the top of standards F F is plate O, provided with lug $n$ and curved lug $o$. In holes in these lugs the small shaft P is held, having at one end the crank R, at the other the bevel-wheel $r$, which gears into worm-gear $t$, whereby the screw T is moved up or down, which, in turn, is secured to lug $k$ on plate E, whereby that is elevated or depressed, carrying with it the boring apparatus. U, Figs. 1 and 3, is the bed whereon the timber rests when being bored, and is supported on the end of table B nearest the operator. It is fitted with rollers $u\ u\ u$, &c., to give the timber longitudinal motion, and has angular motion of a few degrees about axis V, which motion is regulated by curved slot W and set-screw $w$, Fig. 3. This motion of bed U is rarely required, as by the motion of the head about shank $b$ a hole can be bored at any desired angle, and, by elevating and depressing the spindle, at any given height.

In Fig. 5 is a view of a modification of our invention, designed to be used as an end-borer, in connection with the angle-borer; or it may be used by itself as an end or angle borer.

The arrangement for belting, the spindle, and driven pulley, the mechanism for advancing the bit, the standards, and the means of attaching the plate E′ thereto, are substantially the same in construction and operation as heretofore described. The mechanism for elevating and depressing plate E′, with the boring apparatus attached, by means of crank R′, shaft P′, gear-wheels $r′$ and $t′$, and screws T', is substantially similar to that heretofore described, with the exception that there are two screws, one at each end of plate E'. The difference consists in bed A' and bed-plate B'. Bed-plate B' has its lower part grooved to move freely upon the slide on plate E'. It is secured at any given point by set-screw c'. The upper branch of bed-plate B' is cast at right angles to the lower part, and serves as a support for bed A', which is secured thereto by set-screw D'. Bed A' is made with elevated arms H' H', at the extremities of which are the boxes z' z' for holding the spindles, as heretofore described.

Its advantages consist in the facility with which it is adjusted to bore the ends of heavy timbers at any angle and at any desired height.

We are aware that boring-machines have been constructed having devices for raising and lowering the boring mechanism entire; having, also, means for vertical adjustment at different angles; but we know of none where such an arrangement and construction of devices exist as will afford a vertical adjustment combined with a rotating means, enabling the operator to use any horizontal angle preferred, and having, in addition to these, a device traversing the whole carriage, in addition to the means for traversing and operating the auger.

What we claim is—

1. The boring-machine for boring timber and sills herein shown and described, when constructed, arranged, and operating in the manner and for the purposes substantially as specified.

2. The combination of the band X, taut weight Z', and drums Y y with table D, carrying slide E, and boring-spindle G, all arranged and operating in the manner and for the purposes specified.

WILLIAM H. DOANE.
GEORGE W. BUGBEE.

Witnesses:
　A. C. GIBBS,
　GEO. F. MEYERS.